July 21, 1953
H. WECHSLER
2,646,191
SEED EJECTOR FOR PLANTERS
Filed Sept. 6, 1951
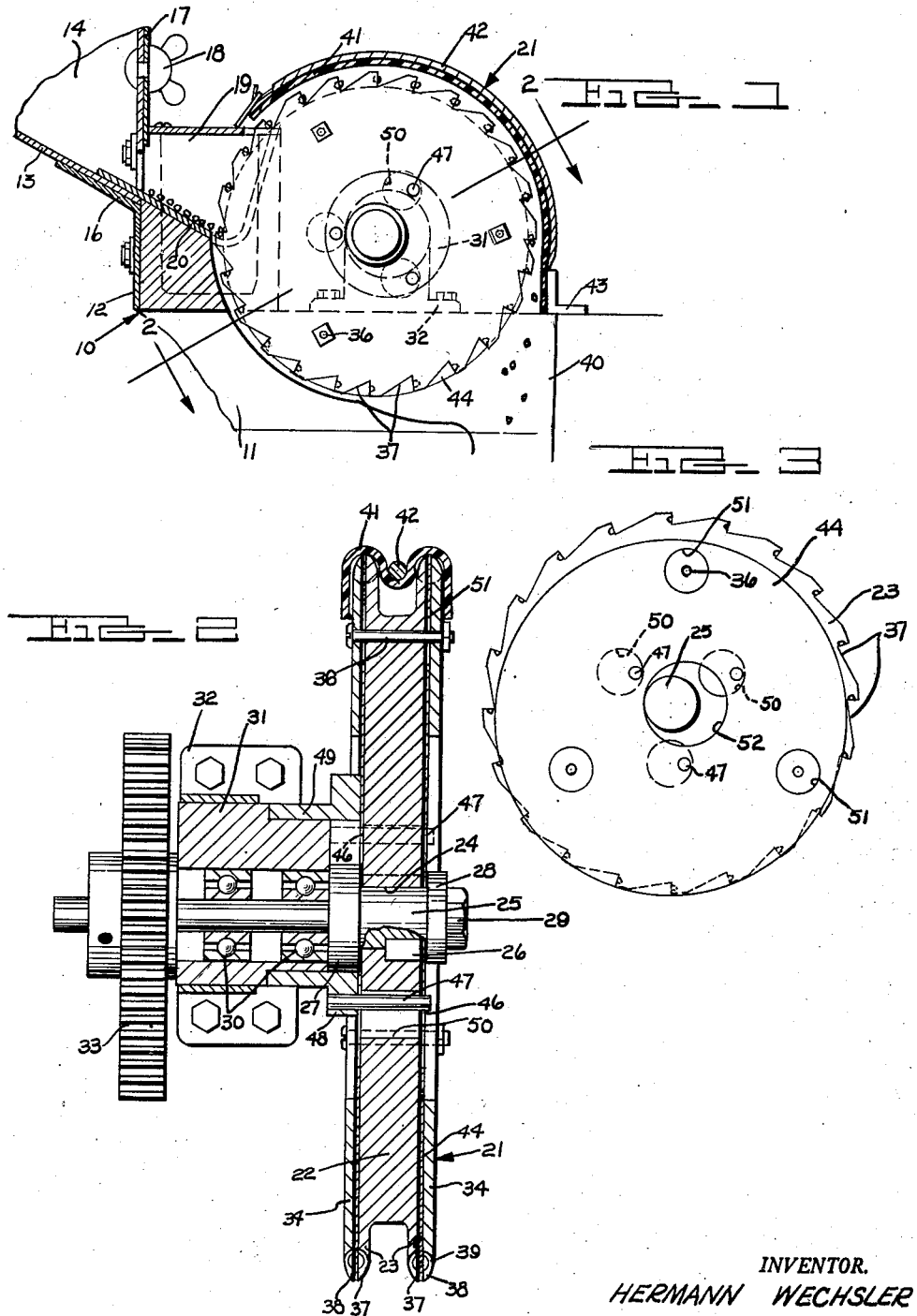
INVENTOR.
HERMANN WECHSLER
BY
ATTORNEY Patented July 21, 1953

2,646,191

UNITED STATES PATENT OFFICE 2,646,191

SEED EJECTOR FOR PLANTERS

Hermann Wechsler, Ventura, Calif., assignor, by mesne assignments, to Dearborn Motors Corporation, Birmingham, Mich., a corporation of Delaware Application September 6, 1951, Serial No. 245,277

8 Claims. (Cl. 222—221)

The present invention relates to a seed wheel for planters and more particularly to a rotatable seed wheel provided with an eccentric scavenging plate movable radially relative to the wheel to positively remove material therefrom.

In machine planting of seed, particularly with reference to the planting of vegetable seed and the like, it has been proposed that seed wheels having peripheral seed pockets be utilized to convey seed from a hopper to a planting chute or similar seed receiving means into which the seed drops under the influence of centrifugal and gravitational forces. However, it has been found that the seed, especially that of the pelletized variety, tends to stick or lodge in the seed pockets, so that the centrifugal and gravitational effects of seed wheel rotation are insufficient to remove the seed, and the seed pockets become more or less clogged resulting in uneven planting or "skipping." This uneven planting may well result in the loss of serious quantitites of plants where large acreages are involved, and scavenging or positive ejection of the seed from the peripheral seed pockets becomes necessary to make mechanical planting economically feasible. Although fixed ejectors have been proposed in the art, such ejectors cause serious damage to the seed and render it unfit for germination.

The present invention provides a positive scavenging means operable in conjunction with centrifugal and gravitational forces normally generated upon rotation of a rotatable seed wheel to prevent lodging or sticking of the seed in the peripheral seed wheel pockets with minimum injury to the lodged seed. Structurally, the present invention comprises a rotatable seed wheel formed of co-rotatable, radially split wheel sections and an eccentric ejector or scavenger plate which is rotatable with the wheel, but about an axis removed from the axis of wheel rotation. The eccentric rotation of the ejector plate with respect to the seed wheel causes radial reciprocation of the plate through the seed pockets which are co-operatively defined by the split wheel elements, and the relative wheel-plate eccentricity is such as to provide positive yet gentle scavenging action without interfering with the pickup of seed in the wheel pockets or the normal centrifugal-gravitational seed discharge from the wheel pockets.

It is, therefore, an important object of the present invention to provide a rotatable seed wheel having an eccentrically rotatable ejector plate associated therewith to insure seed ejection from the wheel.

Another object of the present invention is the provision of an ejector plate interposed between rotatable seed wheel elements defining peripheral seed pockets therebetween, the ejector plate being eccentrically rotatable with respect to the wheel elements to effect radial reciprocation of the ejector plate throughout the extent of the seed pockets.

It is a further important object to provide a seed wheel including rotatable co-axial primary and side elements having notched peripheries providing peripheral seed pockets and an ejector plate interposed between the primary and side elements for rotation therewith about an axis eccentric with respect to the axes of the wheel elements, the ejector plate by virtue of its eccentricity being radially movable throughout the extent of the peripheral seed pockets to positively dislodge seed therefrom.

Still another object of this invention is the provision of a seed wheel including a primary plate co-operable with a pair of side plates to provide a double row of peripheral seed pockets, in combination with a pair of ejector plates interposed between the primary plate and the side plates, respectively, for eccentric reciprocation throughout the radial extent of the seed pockets to remove seed lodged therein.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention.

On the drawings:

Figure 1 is a fragmentary vertical sectional view of a conventional rotary seed plate-type vegetable planter particularly illustrating a seed wheel of the present invention;

Figure 2 is an enlarged sectional view, with parts shown in elevation, taken along the plane 2—2 of Figure 1; and Figure 3 is an elevational view, with parts broken away and in section, more fully illustrating the seed wheel structure.

As shown on the drawings:

In Figure 1, reference numeral 10 refers generally to a seed wheel-type vegetable seed planter of the general type described and claimed in my co-pending application, Serial No. 124,018, filed October 28, 1949, and assigned to the assignee of the present invention.

The seed planter 10 is provided with a longitudinally extending beam 11 upon which is supported a transversely extending supporting angle bracket 12 carrying at its upper end a rearwardly mounted hopper 13. The interior 14 of the hopper 13 is adapted to contain a body of vegetable seed or the like dispensable through a lower opening 16, the size of which is controlled by a vertically extending gate plate 17, the plate being adjustable by suitable means, as by a wing nut 18. The opening 16 communicates with a spout 19 having a downwardly extending spout plate 20 upon which seed from the hopper 13 is received. The forward extent of the plate 20 is slotted to receive therethrough a peripheral portion of a seed plate of the present invention indicated generally at 21.

As best shown in Figure 2, the seed wheel 21 comprises a central primary plate 22 which is generally cylindrical in configuration and which is provided with a pair of axially spaced, radially enlarged flanges 23. The plate 22 is axially bored, as at 24, to receive therethrough a driving shaft 25. The plate is secured to the shaft for rotation therewith, as by a key 26, and the plate is retained on the shaft against axial displacement by a shaft radial collar 27 and a washer 28 on opposing surfaces of the plate and retained by a cap screw 29. The shaft 25 is journaled for rotation by a pair of axially spaced ball bearings 30 disposed within a split retaining collar 31 peripherally clamped within a clamping structure 32 adapted to be secured to the beam 11. The plate 22 and the shaft 25 are driven by means of a sprocket wheel or gear 33 receiving power from a suitable source, as from a ground-engaging wheel of the planter 10.

The outer and opposing radial faces of the plate 22 co-operate with a pair of side plates 34, respectively, which are of substantially the same outer diameter as the flanges 23 and which are secured to the primary plate by suitable means, as by nuts and bolts 36. The peripheral portions of the primary plate flanges 23 and the side plates 34 are notched, as at 37 and 38, respectively, and the radial faces of the notches 37 and 38 are provided with registering recesses for co-operatively defining peripheral, generally hemispherical seed pockets 39.

As the seed wheel is rotated upon its shaft 25, the peripheral seed pockets 39 pass through the split hopper plate 20 and seed upon the plate 20 is picked up by the seed pocket successively. Upon further rotation of the seed wheel 21, the seed within the pockets 39 is peripherally conveyed by the wheel to a position overlying a dispensing chute 40. Due to the radial position of the seed pockets 39, in co-operation with the speed of rotation of the wheel 21, the combined centrifugal and gravitational forces exerted upon the seed normally will cause the seed to fall from the wheel into the dispensing chute 40. In order to aid in preventing the loss of seed from the pockets 39, a transparent arcuate cover member 41 is provided to overlie the seed wheel 21, the cover 41 is retained against displacement by a coil spring 42 lapped thereabout and secured to the spout 19 and a transverse beam 43 at opposite ends thereof.

Even though the combined efforts of gravity and centrifugal force are exerted upon the seed to fling the same from the seed pockets 39, it has been found that some types of seed, in particular pelletized seed, tend to stick or lodge within the seed pockets 39, so as to resist discharge through the chute 40. If this lodged seed were permitted to remain in the pockets 39, proper subsequent seed pick-up would not be obtained and seed pocket skipping and uneven seed dispersion would result. In order to positively scavenge lodged seed from the pockets 39, the present invention provides an eccentric ejector plate 44 adapted to be interposed between the primary seed plate 22 and each of the side plates 34, respectively.

The ejector plates 44 each comprise a relatively thin disc of substantially the same diameter as the primary plate flanges 23, the plates 44 being disposed for rotation about an axis which is displaced from the rotational axis of the shaft 25. As shown in Figure 2, the ejector plates 44 are each provided with inner apertures 46 which receive therethrough pins 47 extending axially of the seed wheel 21, the pins 47 each being carried by an annular flange 48 formed in a collar 49 which is rotatable upon the exterior of the retaining collar 31. It is to be noted that the shaft 35 does not extend axially through the collar 31, but rather is radially displaced from the axis of the collar so that the shaft and the collar are axially eccentric.

Thus, the ejector plate 44, being concentric with the collar 31, is rotatable about an axis radially displaced from the axis of rotation of the remainder of the seed wheel, but the remainder of the seed wheel and the ejector plate are co-rotatable. This co-rotation of the ejector plate and the remainder of the seed wheel is obtained by the provision of apertures 50 formed in the primary plate 22 to receive the pins 47 therethrough, the apertures 50 being of sufficient size to accommodate eccentric movement of the pins 47 relative to the primary plate 22, while at the same time the pins 47 may contact the edges of the apertures to insure co-rotation of the seed wheel elements. Similarly, radially outward portions of the ejector plates are apertured at 51, to receive therethrough the bolts 36 which retain the primary plate 22 and the side plates 34 in assembled relation, and an enlarged central plate aperture 52 is provided to accommodate eccentric rotation of the ejector plate and the shaft 25.

The operation of the seed wheel of the present invention will be readily understood by those skilled in the art inasmuch as the rotation of the primary plate 22 by means of the shaft 25 will cause the seed pockets to pick up seed from the hopper plate 20 and to convey the same to the dispensing chute 40. It will be noted that the axis of rotation of the ejector plate 40 is displaced from the axis of rotation of the primary plate 22 toward the dispensing hopper 40 so that gradual radially outward movement of the ejector plate through the entire depth of the seed pockets will occur in substantial vertical alignment with the dispensing chute 40, and the ejector plate is radially inward of the seed pockets at the point where the primary plate picks up seed from the chute plate 20. Thus, there will be no interference by the ejector plate eccentric reciprocation with seed pick up, while there will be radially outward movement of the ejector plate at the proper point to insure ejection of lodged seed into the dispensing chute. Further, co-rotation of the ejector and the seed plate insures the exertion of a gentle pushing force on the seed, rather than a sharp impact. Consequently, the seed is not subjected to a direct, slicing blow and the seed value is not entirely destroyed.

It will, of course, be understood that many details of construction may be varied through a wide range without departing from the principles of this invention and it is, therefore, not the purpose to limit the patent granted hereon otherwise than necessitated by the scope of the appended claims.

I claim:

1. In a planting machine having a seed hopper, a seed selecting wheel disposed for rotation about a central axis with a portion of its periphery movable through the hopper, said wheel comprising concentric and co-rotatable axially juxtapositioned seed plates having notched peripheries respectively cooperatively providing registering radially extending seed pockets, and an ejector plate interposed between said seed plates, said ejector plate being rotatable with said seed plates but about an axis eccentric with respect to the axis of rotation of said seed plates, the eccentricity of said ejector plate being sufficient to cause relative radial reciprocation of said ejector plate through at least a portion of said seed pockets.

2. In a seed planter having a seed hopper, a seed wheel rotatable through said hopper comprising a pair of juxtapositioned seed plates rotatable about a central axis, said plates having mating peripheral recesses co-operatively defining radial seed pockets, and an ejector plate interposed between said plates, said ejector plate being rotatable about an axis radially removed from said central axis with the resulting axial eccentricity of said ejector plate and the seed plates causing successive peripheral portions of said ejector plate to move radially relative to said seed plates through the radial dimension of said pockets, whereby relative radial movement of said ejector plate will forcibly clear any obstruction from said seed pockets.

3. In a seed planter having a seed hopper, a seed wheel rotatable through said hopper and comprising co-rotatable elements including co-axially disposed seed and side plates having mating peripheral recesses co-operatively defining radially extending seed pockets, and an ejector plate interposed between said seed and side plates and rotatable therewith but about an axis radially removed from the axis of rotation of said seed and side plates, peripheral portions of said ejector plate by virtue of the relative eccentricity thereof being successively movable radially relative to said seed and side plates for reciprocation through said seed pockets to clear the same of obstructions.

4. In a seed planter having a hopper and a seed receiving means spaced therefrom, a seed wheel for individually conveying seed from said hopper to said receiving means comprising a seed disc enterable into said hopper and overlying said seed receiving means, a side plate peripherally co-extensive with said seed disc, said disc and said side plate being co-rotatable about an axis disposed centrally thereof and having registering peripheral notches forming seed pockets for the reception of seed from said hopper to convey the same to said receiving means for gravity and centrifugal discharge thereinto, and an ejector plate interposed between said disc and said side plate for rotation therewith about an axis parallel to but radially displaced from the axis of rotation of said disc and said side plate toward said seed receiving means, the displacement of said axes of rotation being equal to at least one half the radial dimension of said seed pockets and the radially outward eccentric movement of said ejector plate toward said seed receiving means being effective to positively scavenge material from said seed pockets for discharge through said seed receiving means.

5. In a planting machine having a seed hopper and a seed delivery chute spaced therefrom, a seed wheel interposed between said hopper and said chute, means supporting said wheel for rotation about a central axis, said wheel having a plurality of peripheral radially extending seed pockets successively enterable into said hopper to pick up seed therefrom and overlying said chute for gravity and centrifugal seed discharge thereinto upon wheel rotation, each of said pockets being intersected by a radial slit formed in said wheel, and a scavenger plate eccentric with respect to said wheel and having peripheral portions disposed in said slit for relative radial movement upon wheel rotation with said peripheral portions of said plate being successively movable through the entire radial extent of said seed pockets to positively eject seed therefrom.

6. In a planting machine having a seed hopper, a seed delivery chute spaced therefrom, a seed wheel interposed between said hopper and said chute, and means supporting said wheel for rotation about a central axis, said wheel having a plurality of peripheral radially inwardly extending seed pockets successively enterable into said hopper to pick up seed therefrom and overlying said chute for gravity and centrifugal seed discharge thereinto upon wheel rotation, each of said pockets being intersected by a radial slit formed in said wheel, the improvements which comprise a scavenger plate rotatable in synchronism with said wheel about an axis eccentric with respect to the axis of rotation of said wheel and disposed in said slit for relative radial movement upon wheel rotation through the entire radial extent of said seed pockets to positively eject seed therefrom, the periphery of said scavenger plate lying radially inwardly of said seed pockets at said hopper and extending outwardly of said pockets in vertical alignment with said chute.

7. In a seed planting machine having a seed hopper and a seed dispensing chute, a seed wheel interposed between said hopper and said chute comprising a primary seed plate adapted for rotation about a central shaft and having peripheral seed pockets, secondary seed plates disposed on opposing sides of said primary plate and each having peripheral seed pockets registering with those of said primary plate, bolt means extending through said primary and secondary plates for securing the same together for co-rotation about said central shaft, a rotatable collar disposed for rotation about an eccentric axis remote from said central shaft, mounting pins projecting from said collar and extending through said primary and secondary plates, and a pair of eccentric plates carried by said pins and interposed between said primary plate and said secondary plates, respectively, said primary and secondary plates being apertured to accommodate radial movement of said pins upon simultaneous rotation of all of said plates, and said eccentric plates having apertures for accommodating rotation and relative movement thereof with respect to said bolt means and said central shaft.

8. A seed planting machine comprising a central shaft, a primary seed plate, secondary seed plates on opposing sides, respectively, of said primary plate, said primary and secondary plates being co-rotatable about said shaft, a plurality of laterally projecting pins extending through said primary and secondary plates, said pins being disposed for rotation about an axis remote from that of said shaft, and eccentric plates carried by said pins for rotation therewith, one of said eccentric plates being interposed between said primary plate and each of said secondary plates respectively, each of said primary and secondary plates being apertured to receive said pins therethrough and to accommodate the relative movement of said mounting pins with respect to said shaft upon eccentric movement of said eccentric plates.

HERMANN WECHSLER.

References Cited in the file of this patent

UNITED STATES PATENTS

| Number | Name | Date |
|---|---|---|
| 1,119,382 | Worsley | Dec. 1, 1914 |
| 2,374,132 | Radde et al. | Apr. 17, 1945 |